US011144118B2

(12) United States Patent
Van Rotterdam

(10) Patent No.: US 11,144,118 B2
(45) Date of Patent: Oct. 12, 2021

(54) DISTRACTION FACTOR USED IN A/B TESTING OF A WEB APPLICATION

(71) Applicant: CITRIX SYSTEMS, INC., Fort Lauderdale, FL (US)

(72) Inventor: Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 59 days.

(21) Appl. No.: 16/221,995

(22) Filed: Dec. 17, 2018

(65) Prior Publication Data

US 2020/0192470 A1    Jun. 18, 2020

(51) Int. Cl.
*G06F 3/01* (2006.01)
*G06F 16/958* (2019.01)
*G06F 16/957* (2019.01)
*G06K 9/00* (2006.01)
*G06Q 30/02* (2012.01)

(52) U.S. Cl.
CPC ............ *G06F 3/013* (2013.01); *G06F 16/958* (2019.01); *G06F 16/9577* (2019.01); *G06K 9/00302* (2013.01); *G06K 9/00335* (2013.01); *G06Q 30/0242* (2013.01); *G06Q 30/0277* (2013.01)

(58) Field of Classification Search
CPC ............ G06F 16/9577; G06F 11/3438; G06F 11/3419; G06F 11/3452; G06F 16/957; G06F 16/958; G06F 3/013; G06K 9/00302; G06K 9/00335; G06Q 30/0242; G06Q 30/0277
See application file for complete search history.

(56) References Cited

U.S. PATENT DOCUMENTS 7,809,725 B1 * 10/2010 Vasilik .................. G06Q 10/00
                                                    707/736
7,930,199 B1    4/2011 Hill
                        (Continued)

FOREIGN PATENT DOCUMENTS

WO    WO2016115895    7/2016
WO    WO2017200855    11/2017

OTHER PUBLICATIONS

Agnieszka Bojko, "Using Eye Tracking to Compare Web Page Designs: A Case Study", publisher: Journal of Usability Studies, published: May 2006, pp. 112-120 (Year: 2006).*

*Primary Examiner* — Wilson W Tsui
(74) *Attorney, Agent, or Firm* — Allen, Dyer, Doppelt + Gilchrist, PA

(57) ABSTRACT

A computing system includes a web server to provide first and second variants of a web application for A/B testing, and at least one client computing device operated by at least one user. The at least one client computing device includes a web browser and a camera. The web browser is for accessing the first variant of the web application, and for accessing the second variant of the web application. The camera is to record eye movements of the at least one user when viewing the displayed web page from the first variant of the web application, and to record eye movements of the at least one user when viewing the displayed web page from the second variant of the web application. The web server includes an eye movement analyzer to compare the recorded eye movements of the at least one user to determine a distraction factor.

20 Claims, 8 Drawing Sheets

(56) References Cited

U.S. PATENT DOCUMENTS

| | | | |
|---|---|---|---|
| 7,975,000 B2 | 7/2011 | Dixon et al. | |
| 8,108,800 B2* | 1/2012 | Kantamneni | G06Q 30/02 |
| | | | 351/223 |
| 8,489,985 B2* | 7/2013 | Bao | G06F 16/9577 |
| | | | 715/243 |
| 8,885,882 B1 | 11/2014 | Yin et al. | |
| 9,176,744 B2 | 11/2015 | Lee | |
| 9,538,345 B2 | 1/2017 | Sah et al. | |
| 9,606,621 B2* | 3/2017 | Lashina | G06F 3/013 |
| 10,372,782 B1* | 8/2019 | Masterman | G06F 16/9577 |
| 2007/0271352 A1* | 11/2007 | Khopkar | G06Q 30/02 |
| | | | 709/217 |
| 2008/0189156 A1* | 8/2008 | Voda | G06Q 10/063 |
| | | | 705/7.33 |
| 2008/0301573 A1* | 12/2008 | Chi | G06F 16/951 |
| | | | 715/771 |
| 2009/0030859 A1* | 1/2009 | Buchs | G06F 16/957 |
| | | | 706/19 |
| 2013/0005443 A1 | 1/2013 | Kosta et al. | |
| 2013/0325463 A1 | 12/2013 | Greenspan et al. | |
| 2014/0282049 A1* | 9/2014 | Lyon | G06F 3/0484 |
| | | | 715/744 |
| 2016/0227277 A1 | 8/2016 | Schlesinger et al. | |
| 2017/0061967 A1* | 3/2017 | Dow | H04L 65/403 |
| 2017/0139723 A1* | 5/2017 | Holland | G06F 11/3438 |
| 2017/0155971 A1 | 6/2017 | Vaculin et al. | |
| 2018/0020065 A1 | 1/2018 | Kucera | |
| 2018/0307589 A1 | 10/2018 | Falkenberg et al. | |
| 2019/0171284 A1* | 6/2019 | Contractor | G06F 3/0483 |

* cited by examiner

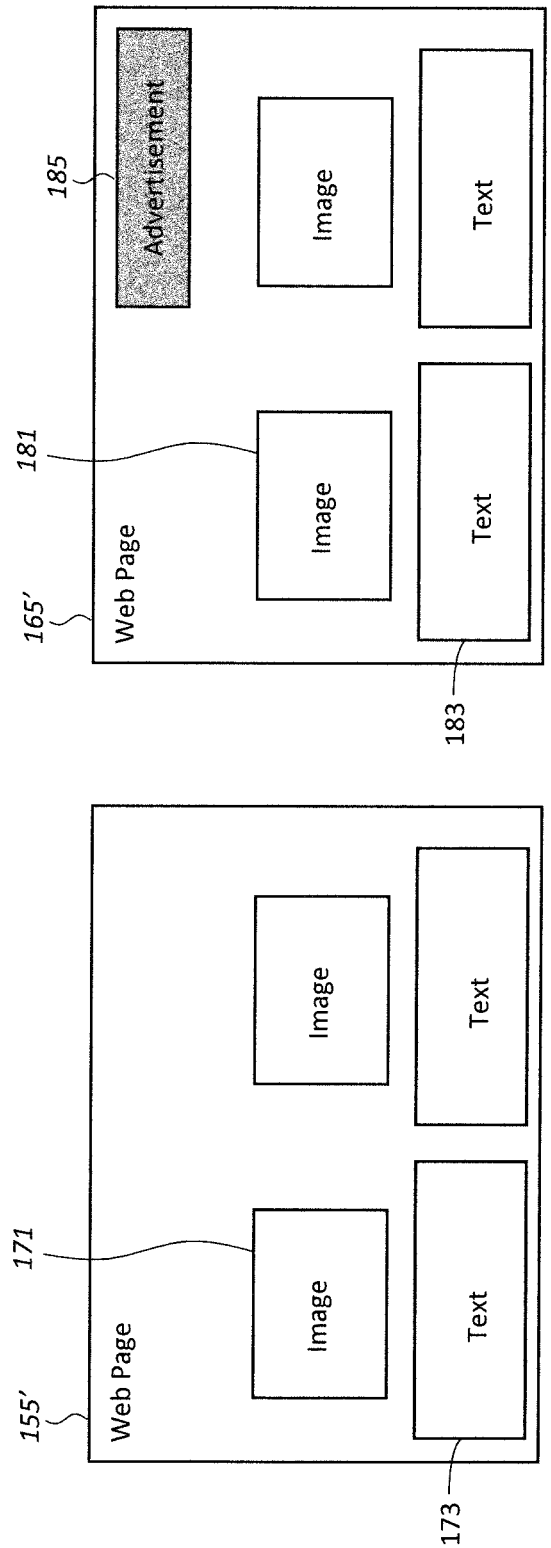

DISTRACTION FACTOR USED IN A/B TESTING OF A WEB APPLICATION

TECHNICAL FIELD

The present disclosure relates to web applications, and more particularly, to A/B testing of a web application that takes into account distraction of end-users accessing the web application.

BACKGROUND

A/B testing of a web application allows two variants to be compared to determine which variant performs better. A/B testing thus provides a means to test whether or not modification of a user interface (UI) of the web page is more efficient for the end-users, or if a particular advertisement on the web page is more efficient in getting the attention of the end-users.

SUMMARY

A computing system includes a web server to provide first and second variants of a web application for A/B testing, and at least one client computing device operated by at least one user. The at least one client computing device includes a web browser, a display and a camera. The web browser is for accessing the first variant of the web application, and for accessing the second variant of the web application. The display is to display a web page from the first variant of the web application, and to display a web page from the second variant of the web application. The camera is to record eye movements of the at least one user when viewing the displayed web page from the first variant of the web application, and to record eye movements of the at least one user when viewing the displayed web page from the second variant of the web application. The web server includes an eye movement analyzer to compare the recorded eye movements of the at least one user to determine a distraction factor.

The distraction factor corresponds to a difference in a number of tracked eye movements between the at least one user. A/B testing of the web application may be performed with the same user being exposed to multiple views of the web application, or may be performed with different users being exposed to respective views of the web application. Detected eye movements of the at least one user are advantageously used to determine the effectiveness of the first and second variants of the web application.

The first and second variants of the web application may be directed to a modified user interface (UI) component of the displayed web page. An effectiveness of the modified UI component corresponds to the distraction factor having a minimal value.

The first and second variants of the web application may be directed to an advertisement on the displayed web page. An effectiveness of the advertisement corresponds to the distraction factor having a maximum value.

The camera may further record facial expressions of the at least one user. The web server further includes a facial recognition analyzer to determine an emotional state of the at least one user, with the effectiveness of the advertisement being further based on the determined emotional state of the at least one user.

The at least one client computing device and the at least one user includes at least one first client computing device operated by at least one first user to access the first variant of the web application, and at least one second client computing device operated by at least one second user to access the second variant of the web application. The eye movement analyzer determines the distraction factor based on comparing the recorded eye movements of the at least one first and second users.

Another aspect is directed to a method for performing A/B testing of a web application. The method includes operating a web server to provide first and second variants of the web application, with the web server comprising an eye movement analyzer. At least one client computing device is operated by at least one user to use a web browser to access the first variant of the web application and to access the second variant of the web application, and to display a web page from the first variant of the web application and display a web page from the second variant of the web application. A camera records eye movements of the at least one user when viewing the displayed web page from the first variant of the web application, and records eye movements of the at least one user when viewing the displayed web page from the second variant of the web application. The eye movement analyzer is operated to determine a distraction factor based on comparing the recorded eye movements of the at least one user.

Yet another aspect is directed to a non-transitory computer readable medium for operating a web server for A/B testing of a web application, and with the non-transitory computer readable medium having computer executable instructions for causing the web server to perform steps as described above.

BRIEF DESCRIPTION OF THE DRAWINGS

FIG. 7 is screen shot of a web page from the first variant of the web application illustrated in FIG. 4 without an advertisement.

FIG. 8 is screen shot of a web page from the second variant of the web application illustrated in FIG. 4 with an advertisement.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime and double prime notations are used for alternate embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
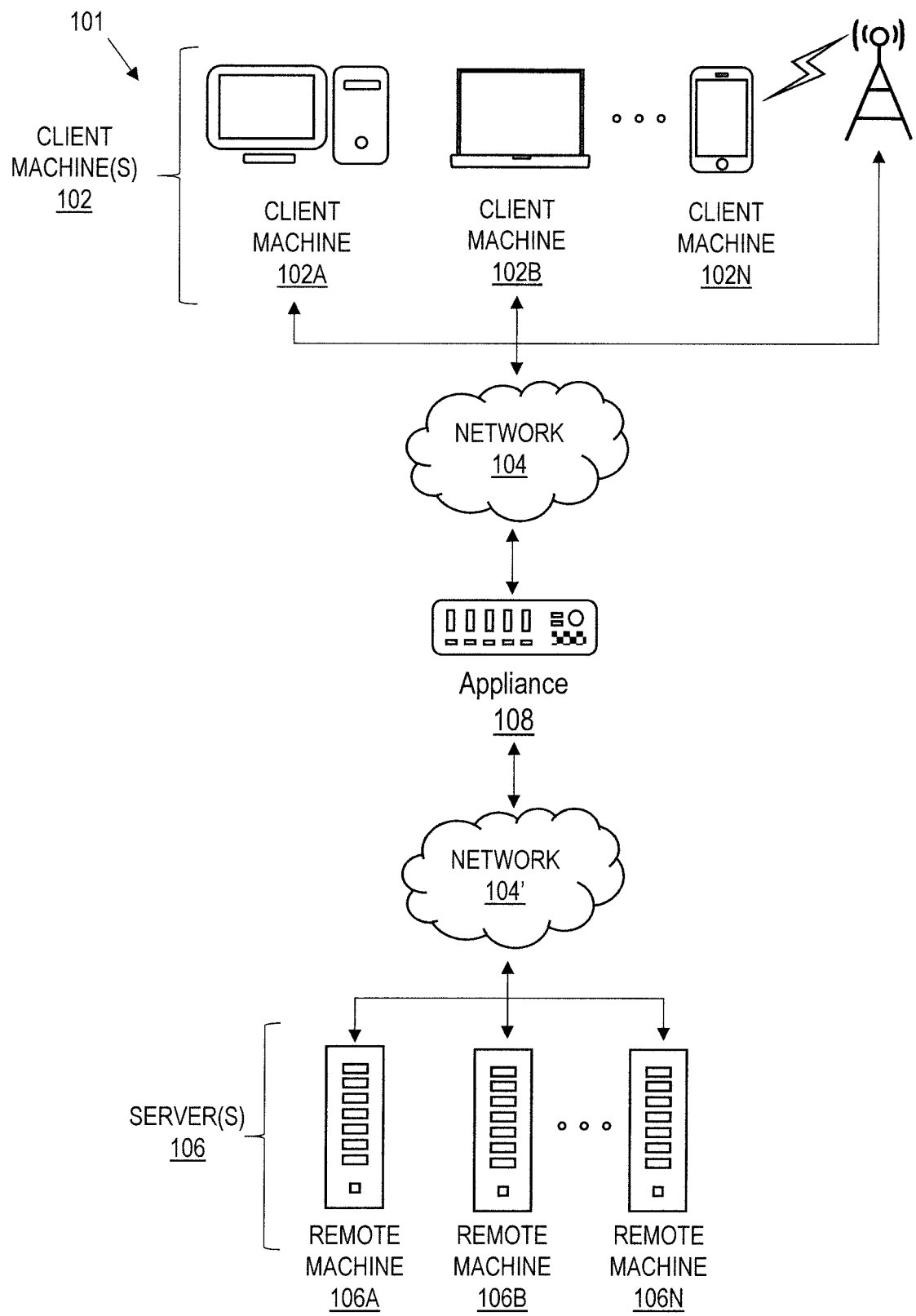
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
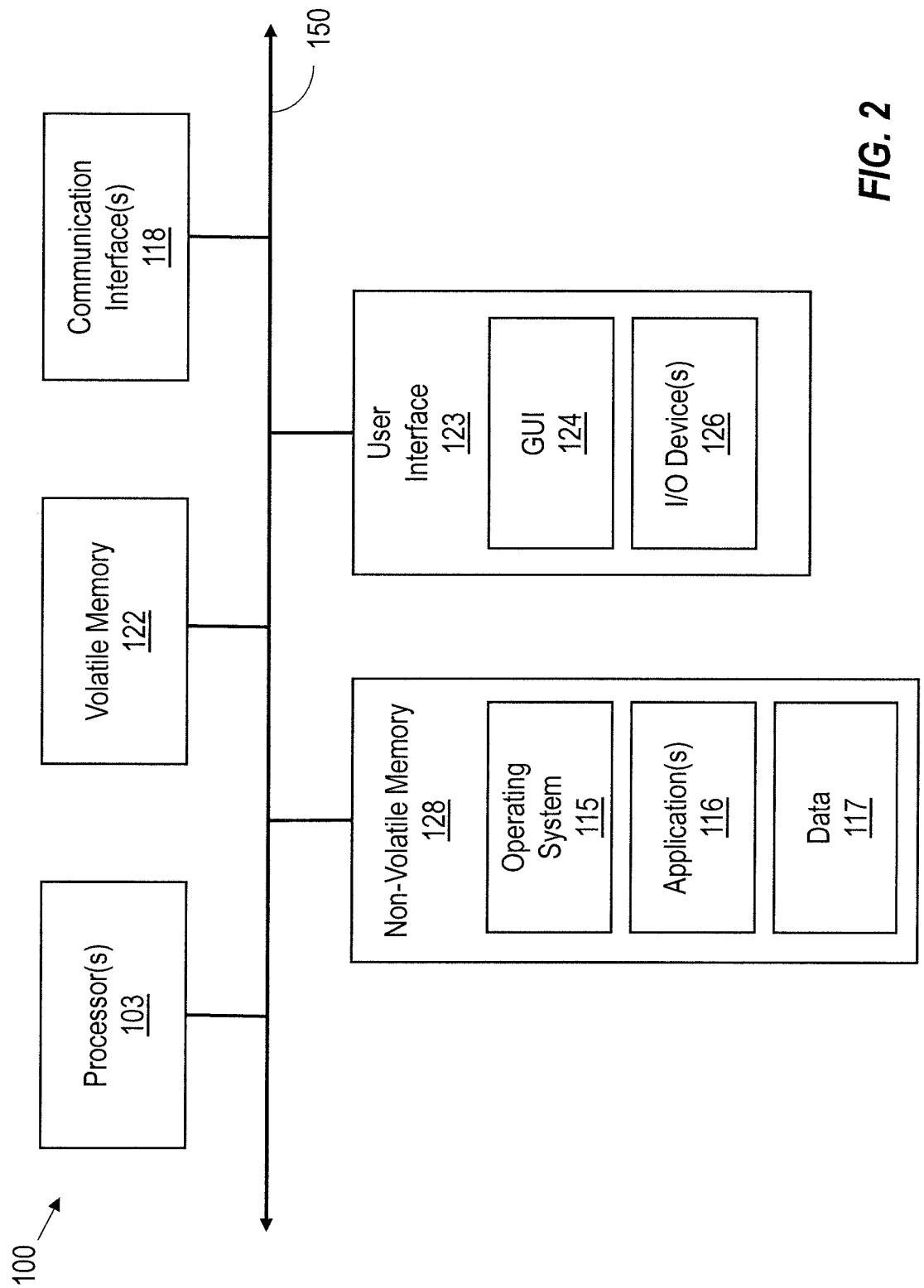
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
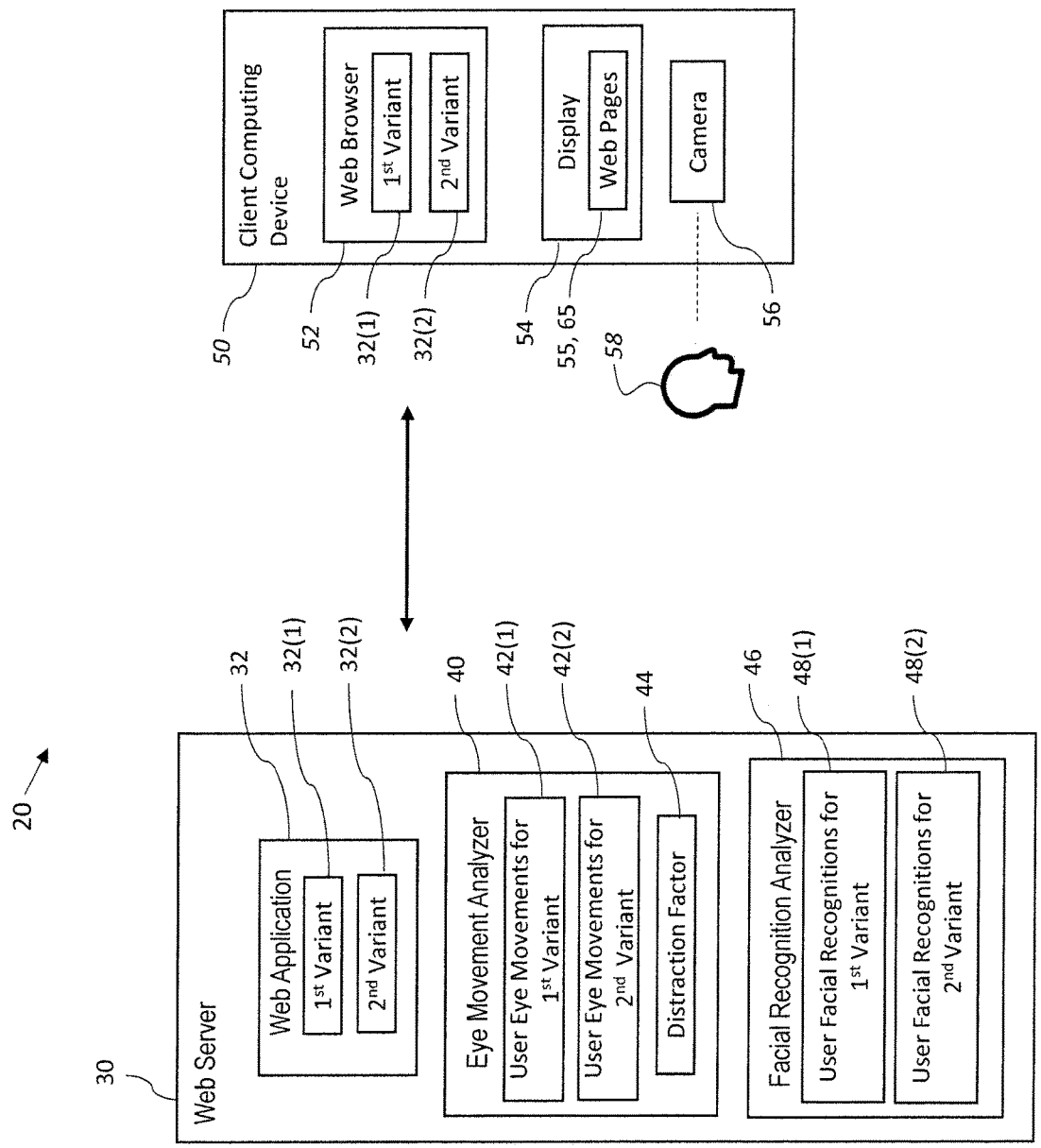
FIG. 3 is a block diagram of a computing system for A/B testing of a web application by the same user in which various aspects of the disclosure may be implemented.

Referring now to FIG. 3, a computing system 20 for A/B testing of a web application 32 for the same user 58 will be discussed. A/B testing allows two variants 32(1), 32(2) of the web application 32 to be exposed to the same user 58 in multiple views of the application 32 so as to determine which variant performs better. As will be discussed in detail below, the efficiency of the variants 32(1), 32(2) is based on determining a distraction factor by analyzing eye movements of the user 58 through a camera 56.

The distraction factor corresponds to a difference in a number of tracked eye movements of the user 58 between exposed views of the first and second variants 32(1), 32(2). When the variant is directed to a modified user interface (UI) component of a web page, for example, then the distraction factor preferably has a minimal value. When the variant is directed to an advertisement or an advertorial on a web page, for example, then the distraction factor preferably has a maximum value.

The computing system 20 includes a web server 30 providing the first and second variants of the web application 32(1), 32(2) for A/B testing. The client computing device 50 includes a web browser 52 for accessing the first variant of the web application 32(1), and a display 54 to display a web page 55 from the first variant of the web application 32(1). A camera 56 is directed at the user 58 to record eye movements when viewing the displayed web page 55.

To test the second variant of the web application 32(2), the web browser 52 accesses the second variant of the web application 32(2), and the display 54 displays a web page 65 from the second variant of the web application 32(2). The camera 56 is still directed at the user 58 to record eye movements when viewing the displayed web page 65.

The web server 30 includes an eye movement analyzer 40 to determine a distraction factor 44 based on comparing the recorded eye movements 42(1), 42(2) of the user 58. Detected eye movements 42(1), 42(2) of the user 58 are advantageously used to determine the effectiveness of the first and second variants of the web application 32(1), 32(2).

The camera 56 is further configured to record facial expressions 48(1) of the user 58 when viewing the first variant of the application 32(1), and to record facial expressions 48(2) of the user 58 when viewing the second variant of the application 32(2). The web server 30 further includes a facial recognition analyzer 46 to determine an emotional state of the user 58. The effectiveness of the advertisement 85 may be further based on the determined emotional state of the user. By combining the distraction factor and the emotional state of the user 58 more effective advertisements can be defined.

Figure 4:
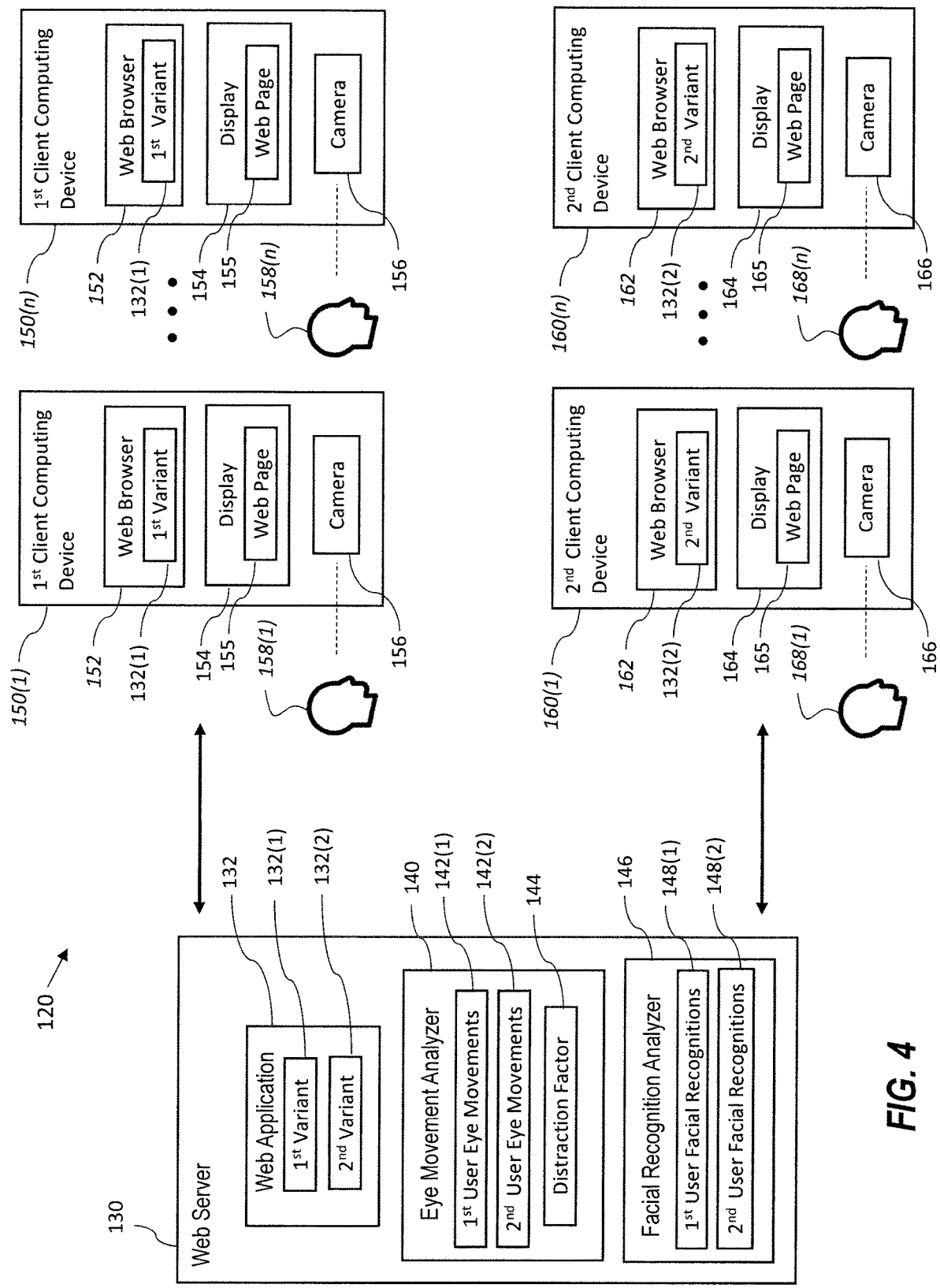
FIG. 4 is a block diagram of a computing system for A/B testing of a web application by different users in which various aspects of the disclosure may be implemented.

Referring now to FIG. 4, the computing system 120 for A/B testing of a web application 132 for different users 158, 168 will be discussed. As above, the efficiency of the variants 132(1), 132(2) is based on determining a distraction factor by analyzing eye movements of the users 158, 168 through a camera 156, 166.

The distraction factor corresponds to a difference in a number of tracked eye movements between the first and second end users 158, 168. When the variant is directed to a modified user interface (UI) component of a web page, for example, then the distraction factor preferably has a minimal value. When the variant is directed to an advertisement or an advertorial on a web page, for example, then the distraction factor preferably has a maximum value.

The computing system 120 includes a web server 130 providing the first and second variants of the web application 132(1), 132(2) for A/B testing. First client computing devices 150(1)-150(n) are operated by first users 158(1)-158(n). The first client computing devices 150(1)-150(n) may be generally referred to as first client computing device 150, and the first users 158(1)-158(n) may be generally referred to as first user 158.

Each first client computing device 150 includes a web browser 152 for accessing the first variant of the web application 132(1), and a display 154 to display a web page 155 from the first variant of the web application 132(1). A camera 156 is directed at the first user 158 to record eye movements of the first user 158 when viewing the displayed web page 155.

Each second client computing device 160 includes a web browser 162 for accessing the second variant of the web application 132(2), and a display 164 to display a web page 165 from the second variant of the web application 131(2). A camera 166 is directed at the second user 168 to record eye movements of the second user 168 when viewing the displayed web page 165.

The web server 130 includes an eye movement analyzer 140 to determine a distraction factor 144 based on comparing the recorded eye movements 142(1), 142(2) of the first and second users 150, 160. Detected eye movements 142(1), 142(2) of the first and second users 158, 168 are advantageously used to determine the effectiveness of the first and second variants of the web application 132(1), 132(2).

Figure 6:
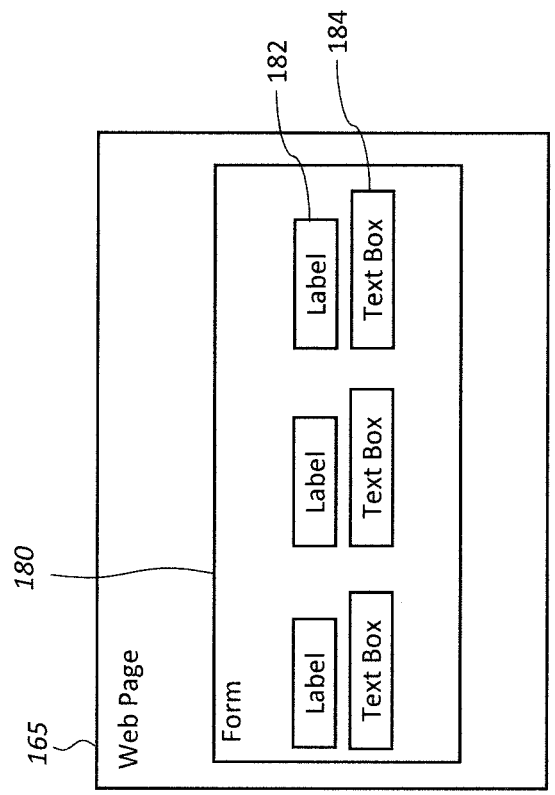
FIG. 6 is screen shot of a web page from the second variant of the web application illustrated in FIG. 4 with a modified UI component.
Figure 5:
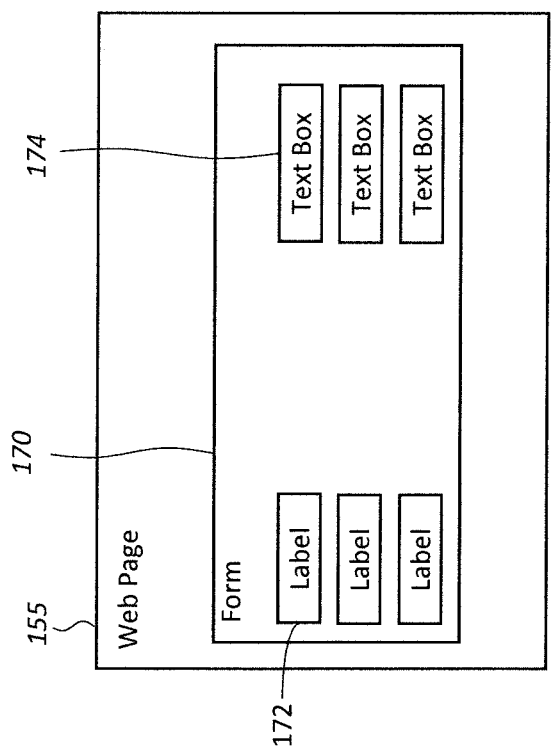
FIG. 5 is a screen shot of a web page from the first variant of the web application illustrated in FIG. 4 with a user interface (UI) component.

As an example, A/B testing of the web application 132 is directed to testing the effectiveness of a modified user interface (UI) component of the displayed web page. The web page 155 in FIG. 5 is from the first variant of the web application 132(1). The web page 165 in FIG. 6 is from the second variant of the web application 132(2).

Preferably there is a large population of first and second users 158, 168. Averaging the number of detected eye movements among the first and second users 158, 168 allows distractions not related to viewing the web page 155, 165 to be factored out. For example, some of the end-users viewing the web pages 155, 165 may be interrupted when someone walks into their office or if they stop to answer the telephone.

The UI component being tested is positioning of labels and text boxes within a form that is to be filled in by the user. The form 170 for the first variant of the web application 132(1) has the labels 172 and the text boxes 174 spaced far apart in a horizontal direction. This is considered the baseline version of the web application 132. Each label 172 identifies the type of data to be entered by the first user 158 in the text box 174 associated therewith. The arrangement of the labels 172 and text boxes 174 in the horizontal direction causes eye movement of the first user 158 in a left/right manner when filling in the text boxes 174.

The form 180 for the second variant of the web application 132(2) has the labels 182 and the text boxes 184 spaced close together in a vertical direction. This is considered the modified UI component of the web application 132 that is being tested. Each label 182 identifies the type of data to be entered by the second user 168 in the text box 184 associated therewith. The arrangement of the labels 182 and text boxes 184 in the vertical direction causes eye movement of the second user 168 in an up/down manner when filling in the text boxes 184.

As the first and second users 158, 168 enter data in the text boxes 174, 184 in their respective forms 170, 180, images of the eyes of the first and second users 158, 168 are provided by the cameras 156, 166 to the web server 130. Each camera 156, 166 is focused on the iris of the eyes of the first or second users 158, 168.

The eye movement analyzer 140 is configured to analyze the images of the eyes of the first and second users 158, 168 for eye movement. Eye movement corresponds to movement of the iris. Eye movements are typically divided into fixations and saccades. Saccades is a rapid eye movement between fixation points. The resulting series of fixations and saccades is called a scanpath. Smooth pursuit describes the eye following a moving object. Fixational eye movements include microsaccades, which are small, involuntary saccades that occur during attempted fixation.

The eye movement analyzer 140 determines the number of eye movements for each user. The more a user 158, 168 has to move his or her eyes when entering text data in the text boxes 174, 184, the more effort it takes to use the web application 132. An increase in effort may cause the user to be more tired. A high number of detected eye movements may be referred to as rubber-necking.

For illustration purposes, it takes an average of 80 eye movements for the first users 158 to enter data into the text boxes 174 in the form 170 for the first variant of the web application 132(1). In contrast, it takes an average of 50 eye movements for the second users 168 to enter data into the text boxes 184 in the form 180 for the second variant of the web application 132(2).

The eye movement analyzer 140 compares the number of detected eye movements of the first and second users 158, 168 to determine a distraction factor. The distraction factor corresponds to a difference in the number of detected eye movements between the first and second users 158, 168.

The distraction factor is 0.625 when determined based on a ratio between the detected eye movements of the first and second users 158, 168. Determination of the distraction factor is not limited to a ratio between the detected eye movements. Another approach for determining the distraction factor is to simply use the difference between the detected eye movements of the first and second 158, 168. In this case, the distraction factor is −30.

The effectiveness of the modified UI component corresponds to the distraction factor having a minimal value. In the modified UI component example, the A/B testing may be repeated using the first variant of the web application 132(1) and a different variant of the web application. The different variant of the web application is similar to the second variant of the web application 132(2), but is further modified with larger size fonts and larger size text boxes 184.

In this case it takes an average of 40 eye movements for the second users 168 to enter data into the text boxes 184 for the different variant of the web application. The distraction factor is 0.5 using the ratio method or −40 using the difference method. Since the distraction factor is being reduced with the different variant of the web application, this modified UI component is preferred over the modified UI component in the second variant.

Some web page dialogs will have expected eye-movement patterns. For instance, if end-users are reading text their eyes will move from left-to-right and then do a carriage return before showing a left-to-right pattern again. A different eye-movement pattern will be detected for languages that do not follow a left-to-right pattern. Expected eye-movement patterns are not limited to a left-to-right movement as readily appreciated by those skilled in the art.

Eye movements can also detect a distraction factor to determine the effectiveness of an advertisement without the user clicking on the advertisement. Tracking when a user clicks on an advertisement is a traditional method of determining the effectiveness of the advertisement.

As another example of A/B testing of the web application 132, the effectiveness of an advertisement will be determined. The web page 155' in FIG. 7 is from the first variant of the web application 132(1) and does not include an advertisement. This is to serve as a baseline when comparing different distraction factors. The web page 165' in FIG. 8 is from the second variant of the web application 132(2) and includes an advertisement 185.

The web page 155' for the first variant of the web application 132(1) includes images 171 and text 173 below the images. The text 173 discusses or describes the images 171. The web page 165' for the second variant of the web application 132(2) is the same as in the web page 155' but further includes an advertisement 185. The advertisement 185 is in the form of a banner in the top right section of the web page 165'. The images 181 and corresponding text 183 are in the same position as in web page 155'.

As the first and second users 158, 168 look at the images 171, 181 and the corresponding text 173, 183, images of their eyes are provided by the cameras 156, 166 to the web server 130. Each camera 156, 166 is focused on the iris of the eyes of the first or second users 158, 168.

The eye movement analyzer 140 determines the number of eye movements for each user. For illustration purposes, it takes an average of 60 eye movements for the first users 158 when viewing the web page 155' for the first variant of the web application 132(1). In contrast, it takes an average of 90 eye movements for the second users 168 when viewing the web page 165' for the second variant of the web application 132(2).

The eye movement analyzer 140 compares the number of detected eye movements of the first and second users 158, 168 to determine a distraction factor. As above, the distraction factor corresponds to a difference in the number of detected eye movements between the first and second users 158, 168. The distraction factor is 1.5 using the ratio method or +30 using the difference method.

The A/B testing may be repeated using the first variant of the web application 132(1) and a different variant of the web application. The different variant of the web application is similar to the second variant of the web application 132(2), but is further modified to where the advertisement 185 dynamically changes while being displayed.

In this case it takes an average of 120 eye movements for the second users 168 when viewing the web page for the different variant of the web application 132. The distraction factor is 2.0 using the ratio method or +60 using the difference method. Since the distraction factor is being increased with the different variant of the web application, the dynamically changing advertisement is preferred over the advertisement in the second variant.

Each camera 156, 166 is further configured to record facial expressions 148(1), 148(2) of each respective first or second user 158, 168. The web server 130 further includes a facial recognition analyzer 146 to determine an emotional state of each respective first or second user 158, 168. The effectiveness of the advertisement 185 may be further based on the determined emotional state of each respective first or second user. For example, the advertisement 185 has a high distraction factor but the second users 168 might react negatively to the advertisement 185. By combining the distraction factor and the emotional state of the end-users more effective advertisements can be defined. Also, the time a first or second user 158, 168 spends looking at an advertisement can be taken into account when determining the effectiveness of an advertisement 185.

Figure 9:
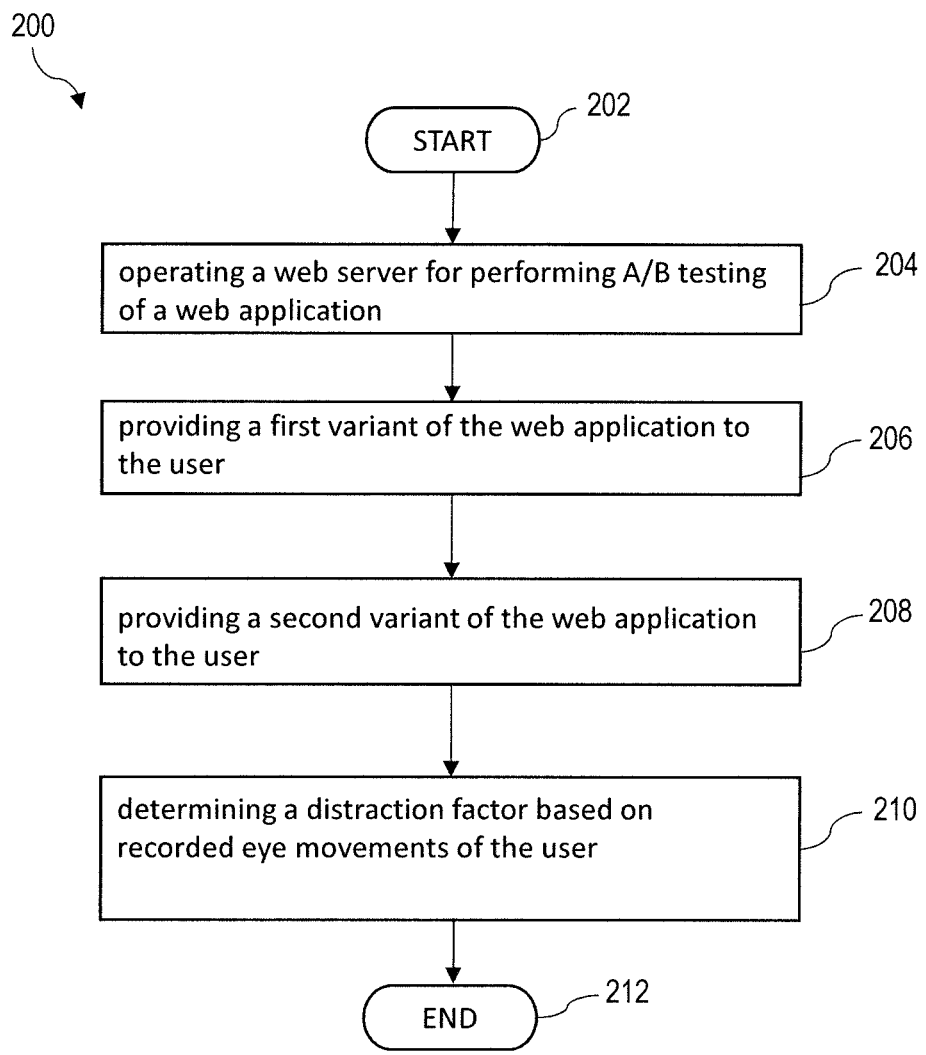
FIG. 9 is a general flowchart illustrating a method for performing A/B testing of a web application using the computing system illustrated in FIG. 3.

Referring now to the flowchart 200 in FIG. 9, and generally speaking, a method for performing A/B testing of a web application 32 for the same user will be discussed. From the start (Block 202), the method includes operating a web server 30 at Block 204 for performing the A/B testing of the web application 32. A first variant of the web application 32(1) is provided to the user 58 at Block 206.

Then, a second variant of the web application 32(2) is provided to the user 58 at Block 208. A distraction factor 44 is determined at Block 210 based on recorded eye movements of the user 58. The method ends at Block 212.

Figure 10:
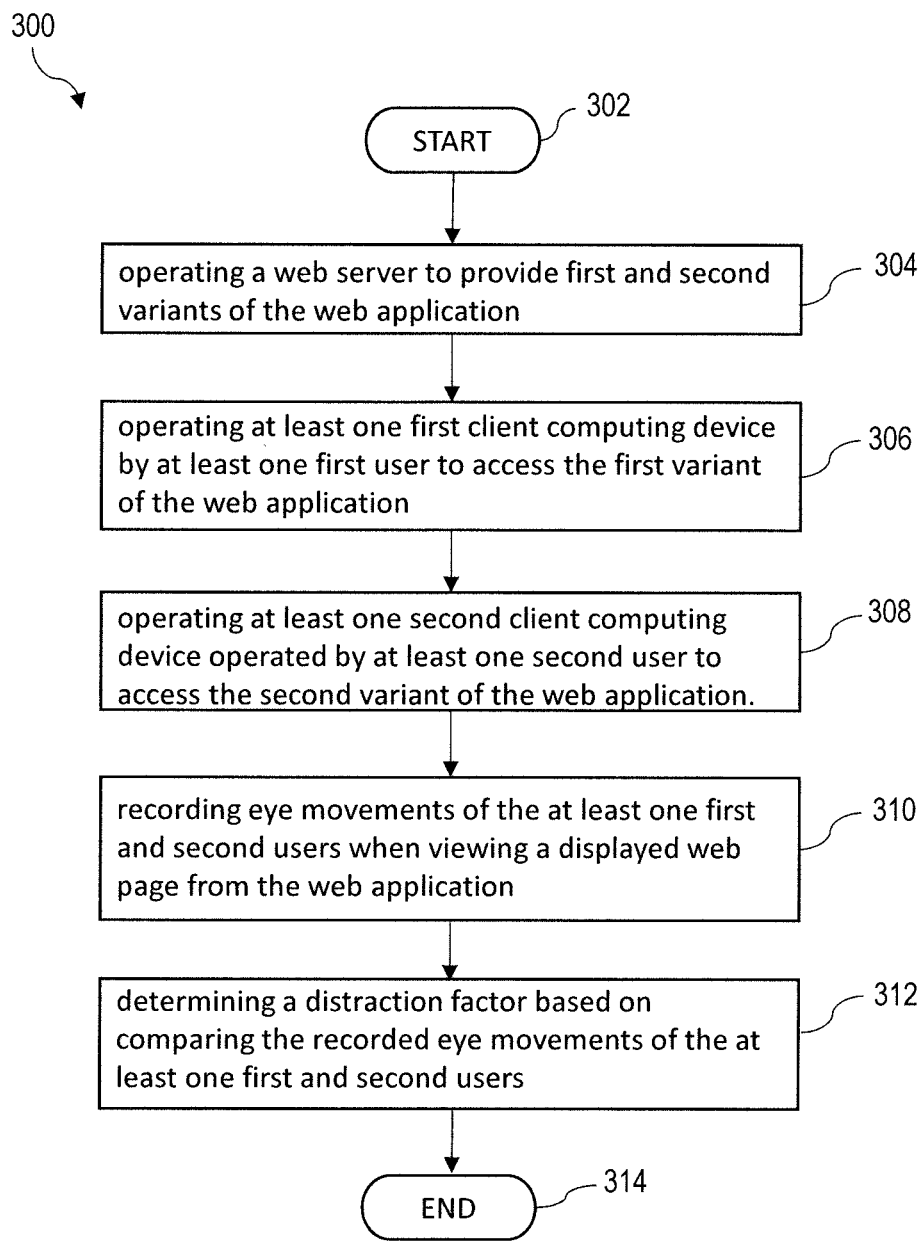
FIG. 10 is a more detailed flowchart illustrating a method for performing A/B testing of a web application using the computing system illustrated in FIG. 4.

Referring now to the flowchart 300 in FIG. 10, more detailed steps for performing A/B testing of the web application 132 for different users will be discussed. From the start (Block 302), a web server 130 is operated at Block 304 to provide first and second variants of the web application 132(1), 132(2). At least one first client computing device 150 is operated by at least one first user 158 at Block 306 to access the first variant of the web application 132(1). At least one second client computing device 160 is operated by at least one second user 168 at Block 308 to access the second variant of the web application 132(2). Eye movements of the at least one first and second users 158, 168 are recorded at Block 310 when viewing a displayed web page 155, 165 from the web application 132. A distraction factor 144 is determined at Block 312 based on comparing the recorded eye movements of the at least one first and second users 158, 168. The method ends at Block 314.

Another aspect is directed to a non-transitory computer readable medium for performing A/B testing of the web application 132. The non-transitory computer readable medium has a plurality of computer executable instructions for causing the web server 130 to provide a first variant of the web application 132(1) to at least one first client computing device 150 operated by at least one first user 158, and to provide a second variant of the web application 132(2) to at least one second client computing device 160 operated by at least one second user 168. Recorded eye movements of the at least one first user 158 are received when viewing a displayed web page 155 from the first variant of the web application 132(1). Recorded eye movements of the at least one second user 168 are received when viewing a displayed web page 165 from the second variant of the web application 132(2). A distraction factor 144 is determined based on comparing the recorded eye movements 142 of the at least one first and second users 158, 168.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing system comprising:
a web server configured to provide first and second variants of a web application for A/B testing; and
at least one client computing device operated by at least one user and comprising:
a web browser for accessing the first variant of the web application, and for accessing the second variant of the web application,
a processor cooperating with the web browser to receive a web page from the first variant of the web application, and to receive a web page from the second variant of the web application,
a display coupled to said processor and configured to display the web page from the first variant of the web application, and to display the web page from the second variant of the web application, and
a camera coupled to said processor and configured to capture a plurality of images of the eyes and associated facial expressions of the at least one user when viewing the displayed web page from the first variant of the web application, and when viewing the displayed web page from the second variant of the web application, said processor is further configured to provide the plurality of images of the eyes and the associated facial expressions of the at least one user to said web server;

said web server comprising:
an eye movement analyzer configured to analyze the plurality of images of the eyes of the at least one user for fixations and saccades to determine a distraction factor when the at least one user is viewing the displayed web pages from the first and second variants of the web application, with the distraction factor corresponding to a ratio of eye movement of the at least one user between the first and second variants of the web application, and a facial recognition analyzer configured to analyze the associated facial expressions to determine an emotional state of the at least one user when viewing the displayed web pages from the first and second variants of the web application;

said web server further configured to determine effectiveness of the first and second variants of the web application based on the emotional state and the distraction factor.

2. The computing system according to claim 1 wherein the distraction factor corresponds to a difference in a number of tracked eye movements between the at least one user.

3. The computing system according to claim 1 wherein the first and second variants of the web application are directed to a modified user interface (UI) component of the displayed web page.

4. The computing system according to claim 3 wherein an effectiveness of the modified UI component corresponds to the distraction factor having a minimal value.

5. The computing system according to claim 1 wherein the first and second variants of the web application are directed to an advertisement on the displayed web page.

6. The computing system according to claim 5 wherein an effectiveness of the advertisement corresponds to the distraction factor having a maximum value.

7. The computing system according to claim 6 wherein the effectiveness of the advertisement is further based on the determined emotional state of the at least one user.

8. The computing system according to claim 1 wherein said at least one client computing device and the at least one user comprises at least one first client computing device operated by at least one first user to access the first variant of the web application, and at least one second client computing device operated by at least one second user to access the second variant of the web application; and wherein said eye movement analyzer is further configured to determine the distraction factor based on comparing the recorded eye movements of the at least one first and second users.

9. A method for performing A/B testing of a web application, and comprising:
operating a web server to provide first and second variants of the web application, with the web server comprising an eye movement analyzer and a facial recognition analyzer;
operating at least one client computing device by at least one user to perform the following:

accessing the first variant of the web application and the second variant of the web application by way of a web browser, receiving, by way of a processor cooperating with the web browser, a web page from the first variant of the web application and a web page from the second variant of the web application, displaying the web page from the first variant of the web application, and displaying the web page from the second variant of the web application, capturing a plurality of images of the eyes and associated facial expressions of the at least one user, by way of a camera coupled to the processor, when viewing the displayed web page from the first variant of the web application, and when viewing the displayed web page from the second variant of the web application, providing to the web server, by way of the processor, the plurality of images of the eyes and the associated facial expressions of the at least one user;

analyzing, by way of the eye movement analyzer, the plurality of images of the eyes of the at least one user for fixations and saccades to determine a distraction factor when the at least one user is viewing the displayed web pages from the first and second variants of the web application, with the distraction factor corresponding to a ratio of eye movement of the at least one user between the first and second variants of the web application; and analyzing, by way of the facial recognition analyzer, the associated facial expressions to determine an emotional state of the at least one user when viewing the displayed web pages from the first and second variants of the web application;

operating the web server further comprises determining effectiveness of the first and second variants of the web application based on the emotional state and the distraction factor.

10. The method according to claim 9 wherein the distraction factor corresponds to a difference in a number of tracked eye movements between the at least one user.

11. The method according to claim 9 wherein the first and second variants of the web application are directed to a modified user interface (UI) component of the displayed web page.

12. The method according to claim 11 wherein an effectiveness of the modified UI component corresponds to the distraction factor having a minimal value.

13. The method according to claim 9 wherein the first and second variants of the web application are directed to an advertisement on the displayed web page.

14. The method according to claim 13 wherein an effectiveness of the advertisement corresponds to the distraction factor having a maximum value.

15. The method according to claim 14 wherein the effectiveness of the advertisement being further based on the determined emotional state of the at least one user.

16. A non-transitory computer readable medium for operating a web server comprising an eye movement analyzer and a facial recognition analyzer for A/B testing of a web application, and with the non-transitory computer readable medium having a plurality of computer executable instructions for causing the web server to perform steps comprising:
providing first and second variants of the web application to at least one client computing device operated by at least one user;

receiving a plurality of images of the eyes and associated facial expressions of the at least one user when viewing a displayed web page from the first variant of the web application, and when viewing a displayed web page from the second variant of the web application;

analyzing, by way of the eye movement analyzer, the plurality of images of the eyes of the at least one user for fixations and saccades to determine a distraction factor when the at least one user is viewing the displayed web pages from the first and second variants of the web application, with the distraction factor corresponding to a ratio of eye movement of the at least one user between the first and second variants of the web application;

analyzing, by way of the facial recognition analyzer, the associated facial expressions to determine an emotional state of the at least one user when viewing the displayed web pages from the first and second variants of the web application, with the emotional state being combined with the distraction factor; and determining, by way of the web server, effectiveness of the first and second variants of the web application based on the emotional state and the distraction factor.

17. The non-transitory computer readable medium according to claim 16 wherein the distraction factor corresponds to a difference in a number of tracked eye movements between the at least one user.

18. The non-transitory computer readable medium according to claim 16 wherein the first and second variants of the web application are directed to a modified user interface (UI) component of the displayed web page, and wherein an effectiveness of the modified UI component corresponds to the distraction factor having a minimal value.

19. The non-transitory computer readable medium according to claim 16 wherein the first and second variants of the web application are directed to an advertisement on the displayed web page, and wherein an effectiveness of the advertisement corresponds to the distraction factor having a maximum value.

20. The non-transitory computer readable medium according to claim 19 wherein the effectiveness of the advertisement is further based on the determined emotional state of the at least one user.

* * * * *